United States Patent
Shim et al.

(10) Patent No.: US 8,996,596 B2
(45) Date of Patent: Mar. 31, 2015

(54) APPARATUS AND METHOD OF GENERATING RANDOM NUMBER

(75) Inventors: Jun Seok Shim, Seongnam-si (KR); Young Sun Park, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 902 days.

(21) Appl. No.: 12/749,689

(22) Filed: Mar. 30, 2010

(65) Prior Publication Data

US 2010/0250637 A1    Sep. 30, 2010

(30) Foreign Application Priority Data

Mar. 30, 2009    (KR) .................. 10-2009-0027043

(51) Int. Cl.
*G06F 7/58* (2006.01)

(52) U.S. Cl.
CPC ........................ *G06F 7/58* (2013.01)
USPC .......................................................... 708/250

(58) Field of Classification Search
None
See application file for complete search history.

(56) References Cited

U.S. PATENT DOCUMENTS

| | | | |
|---|---|---|---|
| 4,286,228 A | 8/1981 | Wise et al. | |
| 6,408,317 B1* | 6/2002 | Djakovic | 708/250 |
| 6,687,721 B1 | 2/2004 | Wells et al. | |
| 6,886,023 B2* | 4/2005 | Lundberg | 708/251 |
| 7,170,996 B1* | 1/2007 | Sarkar | 380/46 |
| 7,174,355 B2 | 2/2007 | Henry et al. | |
| 7,509,500 B2* | 3/2009 | Sarkar | 713/189 |
| 8,379,848 B2* | 2/2013 | Muise et al. | 380/44 |
| 2002/0174152 A1* | 11/2002 | Terasawa et al. | 708/250 |
| 2005/0008154 A1* | 1/2005 | Sarkar | 380/45 |
| 2005/0052703 A1* | 3/2005 | Pettitt et al. | 358/3.19 |
| 2010/0027788 A1* | 2/2010 | Tkacik et al. | 380/46 |

FOREIGN PATENT DOCUMENTS

JP    2000-259395 A    9/2000

* cited by examiner

*Primary Examiner* — David H Malzahn
(74) *Attorney, Agent, or Firm* — Cesari & Reed LLP; Kirk A. Cesari; David K. Lucente

(57) ABSTRACT

A random number generation method and apparatus are disclosed. In the random number generation method, a random number is generated using a plurality of digital signals existing in various storage devices, and thus the speed at which a random number is generated may be significantly increased.

15 Claims, 5 Drawing Sheets

APPARATUS AND METHOD OF GENERATING RANDOM NUMBER

CROSS-REFERENCE TO RELATED APPLICATION

This application claims priority from Korean Patent Application No. 10-2009-0027043, filed on Mar. 30, 2009, in the Korean Intellectual Property Office, the disclosure of which is incorporated herein in its entirety by reference.

SUMMARY

Methods and apparatuses consistent with the exemplary embodiments relate to data encryption technology, and more particularly, to a random number generation apparatus and a random number generation method by which a random number that constitutes a key for use in encryption can be rapidly and efficiently generated when the key for use in encryption is intended to be generated.

According to the related art, a random number generator generates a random number. A random number generated by the random number generator may be used in message encrypting apparatuses, user authentication apparatuses, or the like. For example, when a user encrypts a random number generated by a random number generator by using a public key and transmits the encrypted random number to a server according to an authentication method using a public key, the server decrypts the encrypted random number by using a secret key and authenticates the user to be authentic if a result of the decryption is equal to the random number.

Since hard disc drives (HDDs) are able to be randomly accessed, provide a high data transmission speed, are cost-effective, and easily have a larger capacity than other auxiliary storage devices, HDDs have recently been more frequently used to store multimedia data. As the use of HDDs increases, security of data stored in the HDDs becomes an important issue. Accordingly, data stored in HDDs is increasingly subjected to a procedure such as encryption or user authentication. However, when a random number necessary for the encryption or the user authentication is generated, there exists a limit in the speed at which the random number is generated. This limit impedes improvement in the performance of an encryption system or a security system.

One or more exemplary embodiments provide a random number generation apparatus and method capable of increasing the speed at which a random number is generated.

According to one or more exemplary embodiments, there is provided a random number generation method including the operations of extracting a plurality of digital signals from a storage device; and generating a random number by using the plurality of digital signals.

The operation of generating the random number may include the operations of extracting a noise bit from each of the plurality of digital signals; generating a random word by using the noise bit; and sampling the random word at least once to generate the random number.

The operation of extracting the noise bit may include extracting the noise bit from a least significant bit of each of the plurality of digital signals.

The random number generation method may further include the operations of determining whether the random number is a prime number; and repeating the extracting of the plurality of digital signals, the generating of the random number, and the determining, if the random number is not a prime number.

According to one or more exemplary embodiments, there is provided a random number generation apparatus including a signal extraction unit for extracting a plurality of digital signals from a storage device; and a random number generation unit for generating a random number by using the plurality of digital signals.

The random number generation unit may include a noise bit extraction unit for extracting a noise bit from each of the plurality of digital signals; a random word generation unit for generating a random word by using the noise bit; and a sampling unit for sampling the random word to generate the random number.

The noise bit extraction unit may extract the noise bit from a least significant bit of each of the plurality of digital signals. The sampling unit may sample the random word multiple times to generate the random number.

The random number generation apparatus may further include a control unit for controlling the signal extraction unit and the random number generation unit. The control unit may control the signal extraction unit and the random number generation unit to abandon the random number and generate a new random number if the random number is not a prime number.

The storage device may be a hard disk drive, and the plurality of digital signals may include a position error signal, a spindle speed error signal, a read channel signal, a temperature signal, the freefall sensor signal, and a shock sensor signal.

BRIEF DESCRIPTION OF THE DRAWINGS

Exemplary embodiments will be more clearly understood from the following detailed description taken in conjunction with the accompanying drawings in which.

DETAILED DESCRIPTION OF THE EXEMPLARY EMBODIMENTS

Figure 1:
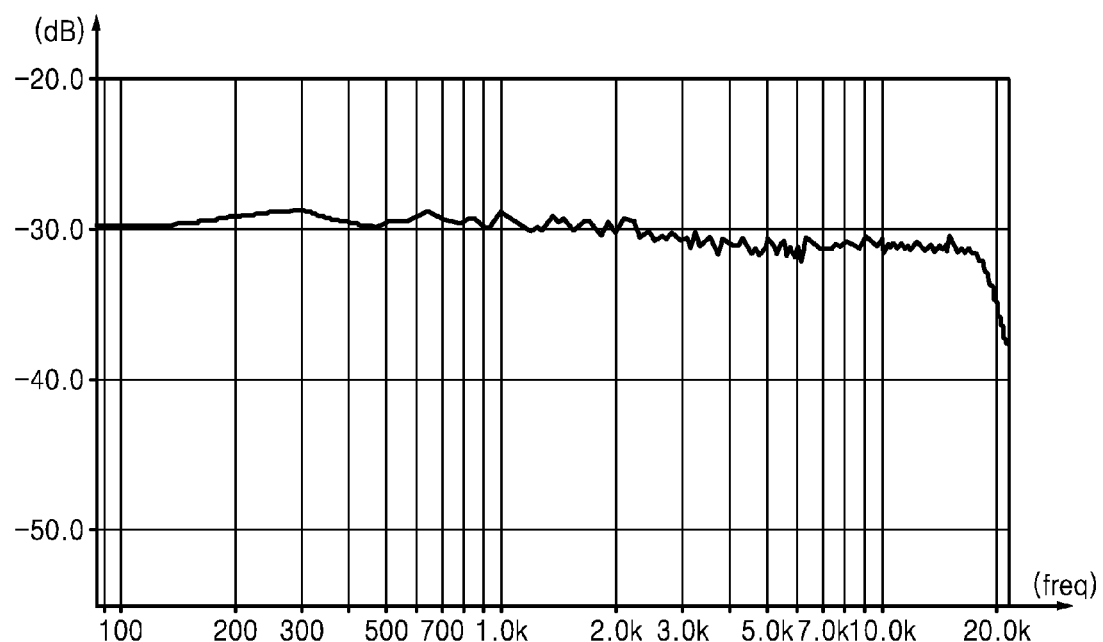
FIG. 1 is a graph showing a frequency spectrum component according to noise included in signals existing in a storage device.

FIG. 1 is a graph showing a frequency spectrum component according to noise included in signals existing in a storage device.

Although a hard disk drive (HDD) is illustrated as a storage device in the specification, is the exemplary embodiments are not limited thereto. The exemplary embodiments may be applied to solid state drives (SSDs), non-volatile memories, volatile memories, and optical disk drives (ODDs), etc.

In a random number generation method according to an exemplary embodiment, a random number may be generated based on digital signals existing in a storage device (for example, a HDD). A plurality of signals for driving the storage device may exist in the storage device, and each of the signals includes noise.

The noise existing in the HDD is close to white noise, and a frequency noise component of the noise may be substantially constant within a frequency band (for example, an audible frequency band). In other words, since a noise component is distributed constantly for each frequency, the noise has good randomness. Consequently, in the random number generation method according to an exemplary embodiment, a random number may be generated based on the noise included in the plurality of signals.

As illustrated in FIG. 1, a noise component of noise is constantly distributed in a frequency band of about 100 Hz to about 20 KHz. According to this characteristic of the noise, the randomness of a random number may significantly improve. A method or apparatus for generating a random number by using noise according to an exemplary embodiment will now be described in detail with reference to FIG. 2.

Figure 2:
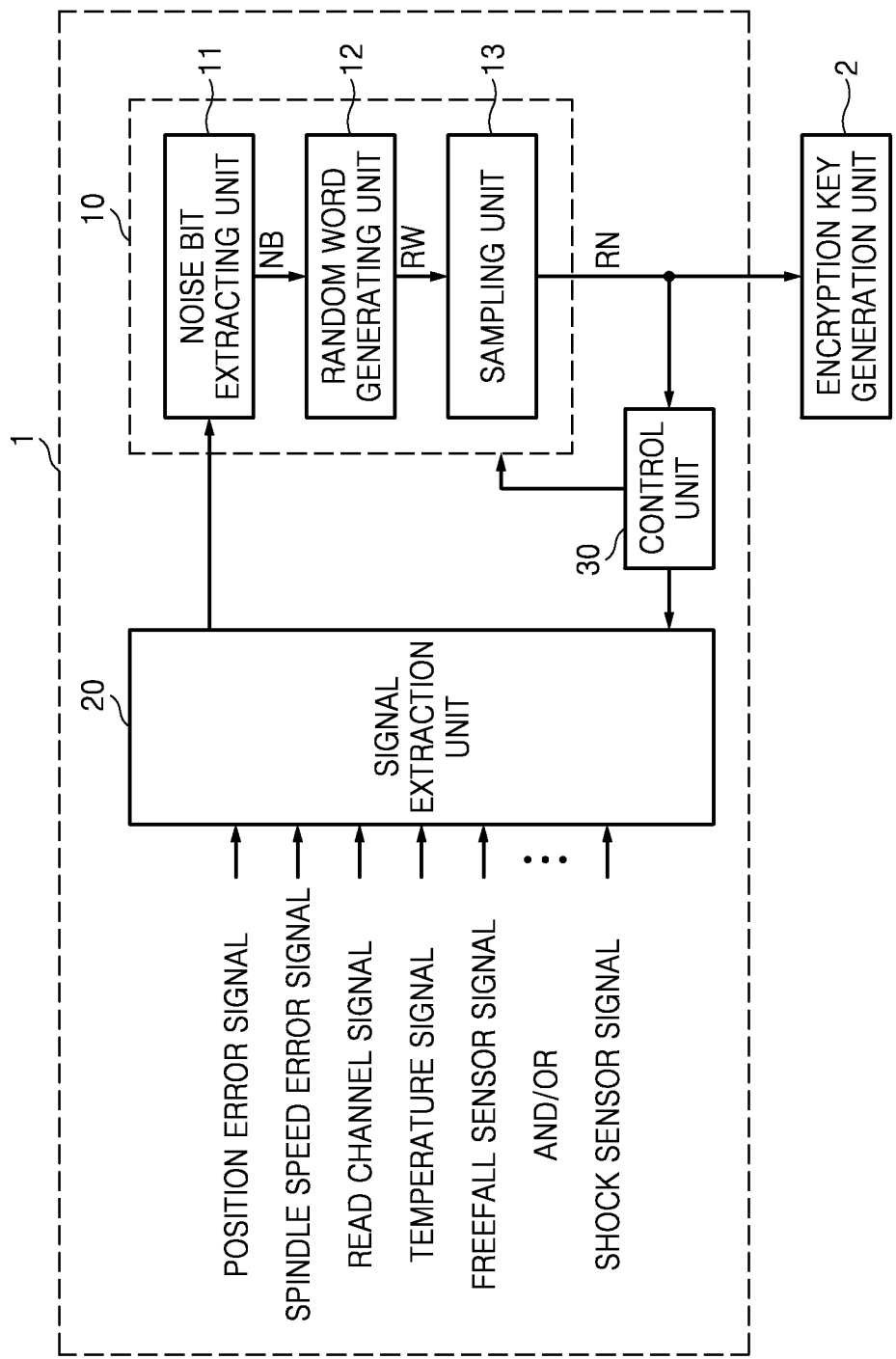
FIG. 2 is a schematic block diagram of a random number generation apparatus according to an exemplary embodiment.

FIG. 2 is a schematic block diagram of a random number generation apparatus 1 according to an exemplary embodiment. Referring to FIG. 2, the random number generation apparatus 1 may include a signal extraction unit 20 and a random number generation unit 10. The signal extraction unit 20 may extract a plurality of digital signals from a storage device. The random number generation apparatus 1 may generate a random number by using various signals existing inside the storage device instead of using external signals. Accordingly, the complexity of the random number generation apparatus 1 may be significantly reduced.

For example, if an HDD is described as the storage device, a plurality of signals that can be extracted from the HDD by the signal extraction unit 20 may include at least one of a position error signal, a spindle speed error signal, a read channel signal, a temperature signal, a freefall sensor signal, and a shock sensor signal. Each of these signals may include noise having the above-described characteristics.

The position error signal may be output from a servo block of a read channel chip and may correspond to the track off degree of a data readout head. The spindle speed error signal may be output from a spindle motor and may correspond to an error value of a spindle speed. The read channel signal may be output from a data block of the read channel chip, and the temperature signal may be output from a preamplifier. The freefall sensor signal may be output from a freefall sensor, and the shock sensor signal may be output from a shock sensor.

The above-described signals may be digitalized and used within the HDD. In this case, the signal extraction unit 20 may extract a plurality of digital signals obtained by digitalization from the storage device and transmit the digital signals to the random number generation unit 10.

In some exemplary embodiments, the above-described signals may be extracted in the form of analog signals. In this case, the signal extraction unit 20 may further include an analog-digital conversion unit (not shown) for converting the extracted analog signals into digital signals.

The random number generation unit 10 may include a noise bit extracting unit 11, a random word generating unit 12, and a sampling unit 13.

The noise bit extracting unit 11 may extract a noise bit NB from each of the plurality of digital signals output by the signal extraction unit 20. In more detail, a noise component may be included in a signal existing in the storage device. In general, the amplitude of the noise component is much smaller than the amplitude of a signal from which the noise has been excluded. For example, if a signal to noise ratio (SNR) is about 40 dB, the amplitude of the signal is about 100 times greater than that of the noise included in the signal. Thus, when such a signal is converted into a digital signal, a noise component occupies a significantly small weight on the digital signal.

In other words, if an arbitrary signal existing in the storage device is digitalized, the noise bit extracting unit 11 may consider a least significant bit (LSB) of a digital signal obtained by the digitalization as the noise bit NB. Accordingly, the noise bit NB is expressed as in Equation 1.

$$NB(=\text{Noise Bit})=LSB(\text{Digital Signal}) \quad [\text{Equation 1}]$$

Since the noise bit extracting unit 11 extracts only an LSB from a digital signal and determines the LSB as the noise bit NB, the noise bit NB may have a 1-bit length.

In an exemplary embodiment, a random number is generated using a plurality of digital signals, and thus this noise bit extraction may be equally applied to all of the signals in the plurality of digital signals. Thus, when noise bits are extracted using a plurality of digital signals, the noise bits are expressed as in Equation 2.

$$\begin{aligned} NB\_1 &= LSB(\text{Digital Signal\_1}) \\ NB\_2 &= LSB(\text{Digital Signal\_2}) \\ &\vdots \\ NB\_N &= LSB(\text{Digital Signal\_N}) \end{aligned} \quad [\text{Equation 2}]$$

Equation 2 relates to extraction of N noise bits NB_1 through NB_N from N digital signals, respectively, and the random word generating unit 12 may generate a random word RW by using the noise bits NB_1 through NB_N output from the noise bit extracting unit 11.

The noise bits NB_1 through NB_N are synthesized to generate the random word RW using Equation 3.

$$RW(\text{Random word})=[NB\_1 \, NB\_2 \ldots NB\_N] \quad [\text{Equation 3}]$$

The plurality of digital signals are all independent from one another and have no correlations with one another, and thus the randomness between the noise bits NB_1 through NB_N may be greatly increased. The length of the random word RW is equal to the number of digital signals used in the synthesis (for example, N bits). Accordingly, as the number of digital signals used in random number generation increases, the size of the random word RW may increase.

The random word RW output from the random word generating unit 12 may be transmitted to the sampling unit 13. The sampling unit 13 may generate a final random number RN by performing a sampling operation on the random word RW at least one time. In more detail, the length of a random number for generating a key for use in data encryption or user authentication needs to be the same as a key length of an algorithm, but if the length (for example, N bits) of the random number generated by the random word generating unit 12 is less than the key length, the sampling unit 13 may generate a random number corresponding to the key length by sampling the random word RW a plurality of number of times. The random number RN output from the sampling unit 13 may be transmitted to an encryption key generation unit 2. The encryption key generation unit 2 may generate an encryption key necessary for data encryption on the basis of the received random number RN.

The sampling operation may be performed a plurality of number of times at different timings by the sampling unit 13. Accordingly, randomness may be secured between a plurality of random words. The plurality of sampling operations performed by the sampling unit 13 are expressed as in Equation 4.

$$\begin{aligned} RN(\text{Random Number})&=[RW(n=1)RW(n=2)\ldots \\ &\quad RW(n=M)] \end{aligned} \quad [\text{Equation 4}]$$

where n denotes the number of times of sampling operations performed. In Equation 4, an M number of times of sampling operations are performed, and the random number RN has a length of a total of n×M bits.

For example, when a random number having a 256-bit length is desired to be generated, if only one digital signal is used, the random word RW has a 1-bit length, and thus 256 sampling operations may be required to generate one random number.

However, since a random number may be generated by using a plurality of digital signals (for example, 8 digital signals) based on a random number generation method according to an exemplary embodiment, the random number may be generated when the random word RW has a 8-bit length and only 32 (=256/8) sampling operations are performed. In other words, the speed at which a random number is generated may increase in proportion to the number of digital signals used in random number generation.

In a random number generation method according to another exemplary embodiment, the noise bit extracting unit 11 may extract the LSB and an LSB−1 previous to the LSB from each of the plurality of digital signals to serve as the noise bit NB. In this case, the randomness of the noise bit NB may somewhat degrade, but the length of the random word RW may increase. Thus, the random number generation speed may increase more than in the random number generation method according to the previous exemplary embodiment, in which only the LSB of each digital signal serves as the noise bit NB.

Although the position error signal, the spindle speed error signal, the read channel signal, the temperature signal, the freefall sensor signal, and the shock sensor signal are described as the signals used in random number generation, they are just examples. In other words, the signals used in random number generation may include all signals that exist in the HDD and include noise.

The random number generation apparatus 1 may further include a control unit 30. When an encryption algorithm according to an exemplary embodiment is a Rivest-Shamir-Adleman (RSA) algorithm, the random number RN output from the random number generation unit 10 may be used as an encryption key only when the random number RN is a prime number.

Accordingly, the random number generation apparatus 1 which may be driven according to the RSA algorithm may further include the control unit 30. The control unit 30 may determine whether the random number RN output from the sampling unit 13 is a prime number. If it is determined that the random number RN output from the sampling unit 13 is not a prime number, the control unit 30 may control the signal extraction unit 20 and the random number generation unit 10 to abandon (or discard) the output random number RN and generate a new random number. On the other hand, if it is determined that the random number RN output from the sampling unit 13 is a prime number, the random number RN may be used to generate the encryption key.

Since the random number RN output from the sampling unit 13 is implemented as a digital value, the control unit 30 may further perform a process of converting the random number RN with a digital value output from the sampling unit 13 into a decimal natural number. Thus, the control unit 30 may determine whether a decimal random number obtained by the conversion is a prime number.

Figure 3:
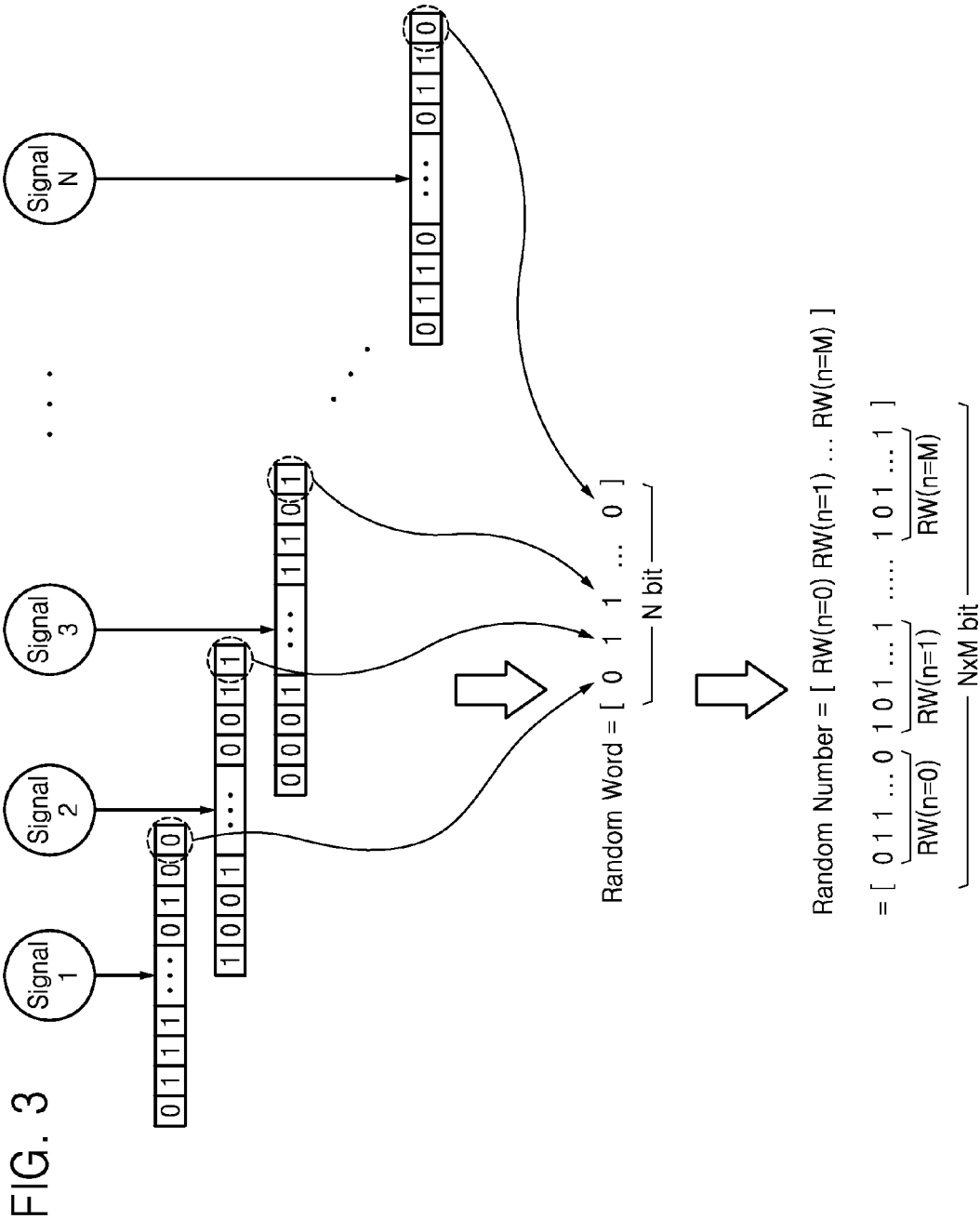
FIG. 3 is a schematic diagram for explaining a random number generation method according to an exemplary embodiment.

FIG. 3 is a schematic diagram for explaining a random number generation method according to an exemplary embodiment. Referring to FIGS. 2 and 3, the noise bit extracting unit 11 may extract the noise bit NB from each of the plurality of signals, for example, a first digital signal Signal 1 through to an N-th digital signal Signal N. As illustrated in FIG. 3, the noise bit extracting unit 11 may extract the LSB of each of the first digital signal Signal 1 through to the N-th digital signal Signal N as the noise bit NB and transmit the noise bits NB to the random word generating unit 12.

For example, the first digital signal Signal 1 may have a digital value of '0111 . . . 0100', and the noise bit extracting unit 11 may extract the LSB of '0' from the digital value and determine the LSB as the noise bit NB. Similarly, the second digital signal Signal 2 may have a digital value of '1001 . . . 0011', and the noise bit extracting unit 11 may extract the LSB of '1' from the digital value and determine the LSB as the noise bit NB.

In other words, the noise bit extracting unit 11 extract the noise bit NB from each of the first digital signal Signal 1 through the N-th digital signal Signal N. The noise bits NB extracted from the first through N-th digital signals Signal 1-Signal N may be transmitted to the random word generating unit 12. At this time, the noise bits NB may be random because the digital signals are independent from one another and random as described above.

The random word generating unit 12 may generate the random word RW by using the noise bits NB extracted by the noise bit extracting unit 11. As illustrated in FIG. 3, the random word RW may have an N-bit length, and the bits that constitute the random word RW may correspond to the LSBs of the first through N-th digital signals Signal 1-Signal N.

The sampling unit 13 may sample, at least one time, the random word RW output by the random word generating unit 12 to generate the random number RN. For example, FIG. 3 illustrates a process of generating a random number by performing a sampling operation on the random word RW M times at different timings, and thus the random number may have a N×M-bit length.

Figure 4A:
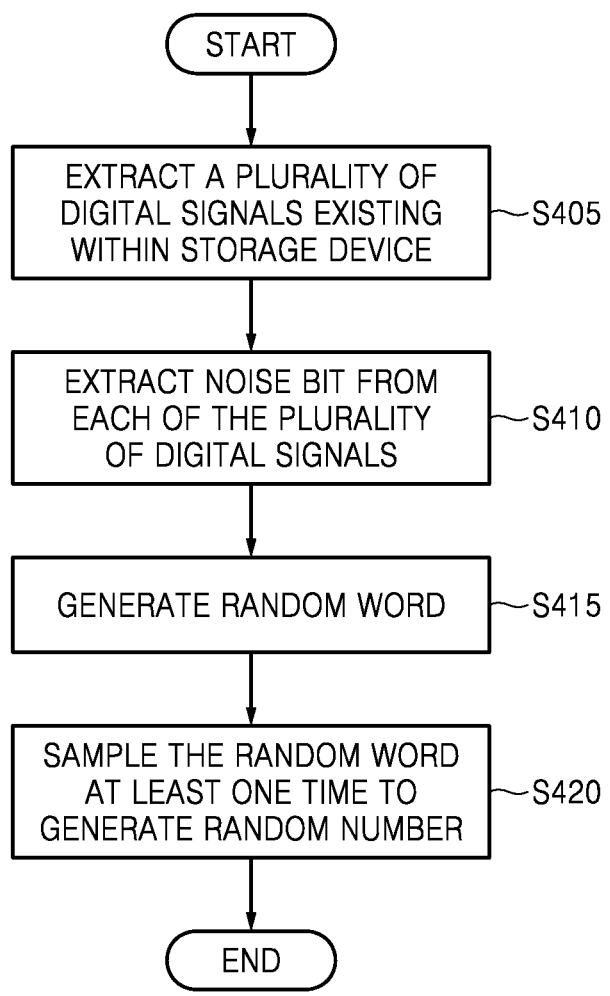
FIGS. 4A and 4B are flowcharts of random number generation methods according to exemplary embodiments.
Figure 4B:
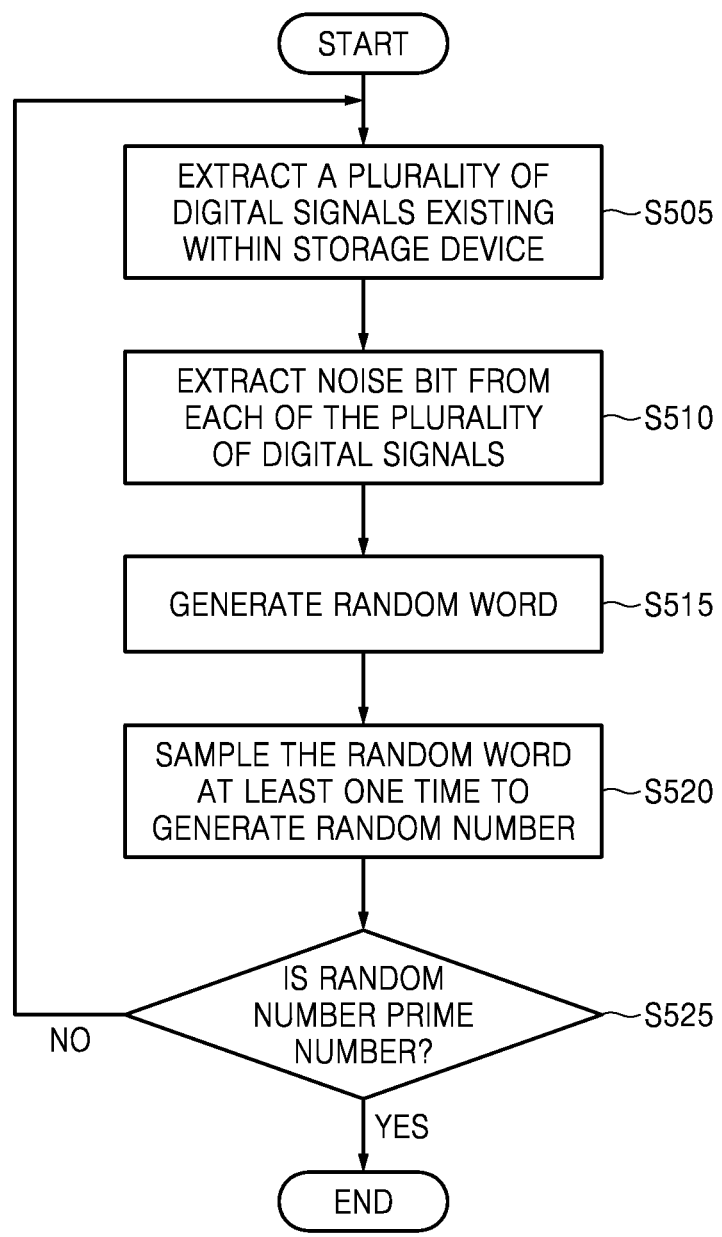

FIGS. 4A and 4B are flowcharts of random number generation methods according to exemplary embodiments. FIG. 4A is a flowchart of a random number generation method based on a general encryption algorithm. Referring to FIGS. 2 through 4A, in operation S405, the signal extraction unit 20 may extract the plurality of digital signals from the storage device. In operation S410, the noise bit extracting unit 11 may extract the noise bit NB from each of the plurality of digital signals. As described above, the noise bit NB may correspond to the LSB of each of the digital signals.

In operation S415, the random word generating unit 12 may generate a random word RW based on the noise bits NB. In operation S420, the sampling unit 13 may sample the random word RW at least one time to generate the random number RN.

FIG. 4B is a flowchart of a random number generation method based on the RSA encryption algorithm. Referring to FIGS. 2 through 4B, in operation S505, the signal extraction unit 20 may extract the plurality of digital signals from the storage device. In operation S510, the noise bit extracting unit 11 may extract the noise bit NB from each of the plurality of digital signals. As described above, the noise bit NB may correspond to the LSB of each of the digital signals.

In operation S515, the random word generating unit 12 may generate a random word RW based on the noise bits NB. In operation S520, the sampling unit 13 may sample the random word RW at least one time to generate a random number RN. In operation S525, the control unit 30 may determine whether the random number RN is a prime number. If it is determined that the random number RN is a prime number, the random number RN may be used as the encryption key. If it is determined that the random number RN is not a prime number, the control unit 30 may control the signal extraction unit 20 and the random number generation unit 10 to abandon (or discard) the random number RN and generate a new random number.

In a random number generation method or apparatus according to an exemplary embodiment, the speed at which a random number is generated may be significantly increased. In addition, in the random number generation method or apparatus according to one or more exemplary embodiments, the performance of a security system or an encryption system for a storage device may significantly improve.

The exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While various exemplary embodiments been particularly shown and described, it will be understood that various changes in form and details may be made therein without departing from the spirit and scope of the following claims.

What is claimed is:

1. A method comprising:
   receiving a plurality of digital signals from a data storage device, the plurality of digital signals are used within the data storage device;
   determining noise bits by extracting at least one bit representative of noise from each of the plurality of digital signals; and
   generating a first random number from each of the noise bits, including sampling a random word by combining the noise bits to form the random word; and sampling the random word multiple times with different timing to generate the first random number.

2. The method of claim 1, further comprising:
   extracting the at least one bit representative of noise comprises extracting a least significant bit (LSB) of each of the plurality of digital signals.

3. The method of claim 1, further comprising:
   determining whether the first random number is a prime number; and
   if the first random number is not a prime number, repeating the extracting the plurality of digital signals, generating a second random number, and determining whether the second random number is a prime number.

4. The method of claim 1, further comprising:
   extracting the at least one bit representative of noise comprises extracting the at least one noise bit from a least significant bit (LSB) and a next LSB of each of the plurality of digital signals.

5. The method of claim 1, further comprising:
   sampling the random word includes sampling the random word until a bit length of the first random number equals a predetermined bit length.

6. The method of claim 1 wherein the plurality of digital signals are used for different purposes within the data storage device.

7. An apparatus comprising:
   a data storage device including:
      a signal extraction unit that extracts a plurality of digital signals from the data storage device, at least two of the plurality of digital signals having different originating sources from each other;
      a random number generation unit configured to:
         determine noise bits by extracting at least one bit representative of noise from each of the plurality digital signals; and
         generate a first random number from the noise bits;
      the random number generation unit includes:
         a noise bit extraction unit that extracts the at least one bit from each of the plurality of digital signals;
         a random word generation unit that generates a random word by combining the noise bits; and
         a sampling unit that samples the random word at least two times with different timings to generate the first random number.

8. The apparatus of claim 7, wherein the noise bit extraction unit extracts the at least one bit from a least significant bit (LSB) of each of the digital signals.

9. The apparatus of claim 7, further comprising:
   a control unit that controls the signal extraction unit and the random number generation unit, the control unit directing the signal extraction unit and the random number generation unit to discard the first random number and generate a second random number if the first random number is not a prime number.

10. The apparatus of claim 7, wherein the noise bit extraction unit extracts the at least one bit from a least significant bit (LSB) and a next LSB of each of the digital signals.

11. The apparatus of claim 7, further comprising:
    the sampling unit samples the random word until a bit length of the first random number equals a predetermined bit length.

12. The apparatus of claim 7, further comprising:
    the device is a hard disk drive, and the plurality of digital signals include at least one of a position error signal, a spindle speed error signal, a read channel signal, a temperature signal, a freefall sensor signal, and a shock sensor signal.

13. An apparatus comprising:
    a signal extraction unit configured to receive multiple signals, at least two of the multiple signals having different originating sources from each other;
    a bit extraction unit configured to extract a least significant bit from each of the multiple signals;
    a random number generation unit configured to generate a random number from each least significant bit extracted from the multiple signals;
    a word generation unit configured to combine each least significant bits from the multiple signals to form a random word;
    a sampling unit configured sample the random word to generate the random number;
    an encryption key generation unit configured to generate an encryption key from the random number; and
    the sampling unit is configured to sample the random word a plurality of times at different timings such that a length of the random number is a predetermined length to generate the encryption key.

14. The apparatus of claim 13, further comprising:
    a control unit configured to control the signal extraction unit and the random number generation unit to generate another random number if a previously generated random number is not a prime number.

15. The apparatus of claim 13, further comprising:
    the apparatus is a data storage device;

the multiple signals are generated within the data storage device and are independent from one another; and a length of the random word is equal to the number of multiple signals.

* * * * *